United States Patent [19]
Stastny

[11] Patent Number: 5,206,033
[45] Date of Patent: Apr. 27, 1993

[54] DEVICE FOR PRODUCING INJECTION MOLDED PARTS AND COMPRISING HEATED AND/OR COOLED AS WELL AS TEMPERATURE-CONTROLLED SUPPLY CONDUITS FOR MOLTEN MATERIAL

[76] Inventor: Erich Stastny, Parkstrasse 9, A-2521 Trumau, Austria

[21] Appl. No.: 221,514
[22] PCT Filed: Oct. 16, 1987
[86] PCT No.: PCT/AT87/00061
  § 371 Date: Jun. 15, 1988
  § 102(e) Date: Jun. 15, 1988
[87] PCT Pub. No.: WO88/02688
  PCT Pub. Date: Apr. 21, 1988

[30] Foreign Application Priority Data
Oct. 16, 1986 [AT] Austria ................................. 2749/86

[51] Int. Cl.$^5$ ............................................. B29C 45/78
[52] U.S. Cl. ................................ 425/143; 425/182 R; 425/547; 425/548
[58] Field of Search ................... 264/40.1, 40.6, 328.14, 264/328.15; 425/143, 144, 547–550, 182, 183, 185, 190, 195, 192 R

[56] References Cited
U.S. PATENT DOCUMENTS
4,707,310 11/1987 Debeaud ............................ 425/144

FOREIGN PATENT DOCUMENTS
58-222827 12/1983 Japan ............................. 425/190

OTHER PUBLICATIONS
Plastics Engineering, vol. 40, No. 4, Apr. 1984, "Streamlined mold changing: a key to profitability" by Ruhl, pp. 39–42.

Primary Examiner—Jill L. Heitbrink
Attorney, Agent, or Firm—Remy J. VanOphem

[57] ABSTRACT

In a mold for producing injection molded parts, the supply conduits for supplying molten material to the mold cavity are heated by various heating devices. Temperature measuring devices are provided for determining the temperature at predetermined locations within the melt flow. For the purpose of controlling the various heating devices depending on the predetermined temperatures at the individual measuring points, there is removably fixed to the mold at least one regulating member which is electrically connected via an electrical connector socket with electrical conduits installed within the interior of the mold. The electrical conduits installed within the interior of the mold are lead to the various heating and temperature measuring devices. The regulating member can be connected via an external conduit with a data supply and indicator member. The regulating member as well as the data supply and indicator member are preferably equipped to store several programs.

9 Claims, 2 Drawing Sheets

DEVICE FOR PRODUCING INJECTION MOLDED PARTS AND COMPRISING HEATED AND/OR COOLED AS WELL AS TEMPERATURE-CONTROLLED SUPPLY CONDUITS FOR MOLTEN MATERIAL

BACKGROUND OF THE INVENTION

The invention is a device for producing injection molded parts having a mold including supply conduits, such as passages, nozzles or the like, for molten material and heating means and/or cooling means with temperature measuring means, which means are interconnected via regulating means. The injection molded parts consist preferably of synthetic plastic material but can also be produced from metals suitable for the injection molding process.

It is already known to produce injection molded parts by a continuous injection molding process which assures a rapid operation sequence and which avoids, to a great extent, the formation of coupons which must be comminuted when reusing the material. In such a continuous injection molding process, the passages, nozzles or the like for supplying the molten material therethrough into the mold cavity must, for the purpose of obtaining an acceptable product, be heated such that the molten material has a definite temperature at predetermined locations. If the temperature is below the predetermined value, the molten material will not have the viscosity required for obtaining an acceptable product, while, if the temperature is too high, the molten material is decomposed and, for example, emits toxic constituents. For the purpose of maintaining a constant temperature within a predetermined temperature interval at definite locations in the conduits for supplying molten material, it has already been proposed to provide temperature measuring devices at the respective locations, noting that the temperature measured in each temperature measuring device is transmitted via an electric conduit to a regulating means assigned to each temperature measuring device which is arranged separately from the mold. An associated heating device is controlled via a further conduit by the regulating means. Such an arrangement permits reliable maintenance, during normal operation, of constant temperatures at the individual measuring points within a predetermined temperature interval, but has numerous drawbacks. Because of the necessity of providing an electrical conduit leading from each measuring device out of the mold to the associated regulating means and of providing a further electrical conduit from the regulating means to the associated heating or cooling device in the mold, numerous electrical conduits are arranged outside the mold. Accordingly, there is the risk of damaging the conduits or of interrupting the connecting points of the conduits when they are performing or monitoring the injection molding process, so that no unobjectionable operation is possible with respect to the temperature control. A further drawback of this known arrangement is that the temperatures are maintained constant at predetermined measuring points but that no dialogue is established between the individual measuring points. If, for example, the temperature changes at a definite measuring point due to external influences, the temperatures measured at adjacent measuring points are not automatically adjusted to another value. This also occurs when there is a change in, for example, the temperature of the molten material. Finally, it is necessary that, for the purpose of compensating a temperature rise due to friction phenomena, a higher temperature exists at the individual measuring points when starting the injection molding process than after a certain start-up time. In the known arrangement, the temperature changes required in case of these events can only be effected by an operator optically monitoring the temperature values. The operator, which, as a rule, has to attend to a plurality of injection molding devices, is frequently overcharged, so that rejects are produced due to false temperatures at the individual measuring points or incorrect temperature relations between the individual measuring points, and individual parts of the injection molding device may become damaged. If a failure occurs, it may be necessary to shut down the plant so that the defect may be located and eliminated.

SUMMARY OF THE INVENTION

The inventive device for producing injection molded parts includes a mold containing supply conduits, such as passages, nozzles or the like, for molten material. The supply conduits are equipped with heating and/or cooling means and with temperature measuring means and have regulating means for the heating means and/or cooling means. At least one regulating means is removably mounted to the mold and has an electrical connector socket for providing a connection to electrical conduits installed within the interior of the mold and leading to the heating means and/or cooling means and to the temperature measuring means. Removable mounting of the regulating means can, for example, be effected by means of a plug connector or by inserting a regulating means having the shape of a plug-in slide into a compartment provided in the mold. This type of mounting of the connection with the individual heating means and/or cooling means and with the individual temperature measuring means is effected via the electrical connector socket and the conduits installed within the interior of the mold, so that the number of conduits arranged outside of the mold, which are a frequent source of failure, can be reduced to a great extent. In addition to a supply conduit for supplying the required electrical energy to the regulating means, an external conduit for electrically connecting the regulating means with a data supply means and data indicator means as well as a further external conduit for electrically connecting the regulating means for regulating the flow of molten material to the supply conduits for molten material can also be provided. The electrical connection between the regulating means and the data supply and indicator means via an external conduit results in the advantage that the data supply and indicator means can be separated from the regulating means during normal operation. The data supply and indicator means, which can be connected to the regulating means via a standardized interconnector, serves, on the one hand, the purpose of pre-programming the regulating means so as to achieve optimum temperature conditions at all operating conditions and, on the other hand, for optically indicating the individual measured values and operating conditions via a display screen and/or via measuring instruments, so as to be, for example, in the position to rapidly locate with low expenditure a failure source in case of an occurring disturbance. Such occurring disturbances may be indicated by an acoustical and/or optical signal delivered by the regulating means if such disturbances are not automatically compensated for by the regulating means.

The supply of molten material can be interrupted or, respectively, the plant may be shut down by means of the external conduit connecting the regulating means with a control means for controlling the supply of molten material if a disturbance which could damage the plant during further operation is recognized by the regulating means.

The electrical conduits leading to all heating means and/or cooling means and the electrical conduits leading to all temperature measuring means may be connected via an electrical connector socket with one single regulating means, which then effects the control of the temperature conditions within the whole plant. However, because of space requirements or other technical control reasons, it may also be convenient to removably connect several regulating means to the mold, each of which includes an electrical connector socket for effecting a connection to electrical conduits installed within the interior of the mold and leading to some of the heating means and/or cooling means and to some of the temperature measuring means and for effecting a connection to electrical conduits installed within the interior of the mold and interconnecting one with the interior of the mold and interconnecting one with the other of the individual regulating means. If external conduits are provided for effecting a connection with a data supply and indicator means and/or with a control means, only one regulating means is provided. Also in this case, a dialogue is effected between the regulating means via the electrical conduits installed within the interior of the mold and interconnecting one with the other of the individual regulating means, so that monitoring of the temperature conditions within the whole plant is effected with consideration of the mutual influences at the individual measuring points. Furthermore, the necessity of providing a great number of such external conduits is again avoided due to the fact that one single regulating means is provided with such external conduits when external conduits are provided.

An individual regulating means or all regulating means may be adapted to store several programs. This results in the advantage that one and the same regulating means may be used for different injection molds and, thus, different compositions of molten material, by selection of an appropriate program.

Also, the data supply and indicator means is equipped to store several programs, so that all regulating circuits may be programmed for the purpose of achieving optimum conditions.

For the purpose of protecting the electronic equipment, primarily within the regulating means but also within the data supply and indicator means, a safety circuit can be installed which releases an alarm signal and shuts down the plant if the temperature rises above a predetermined value which might be dangerous for the electronic equipment.

It is an object of the present invention to avoid the drawbacks of the known prior art arrangement and to provide a process and a device which permits uniform monitoring of all measuring points and uniform regulating of all heating means or cooling means, and which also considers the mutual influence of individual temperature values.

It is a further object of the invention to provide a device in which it is not necessary to arrange numerous electrical conduits outside of the mold.

It is a further object of the invention to provide a device which permits regulation, in common, of all regulating points according to a predetermined program with consideration of the temperatures measured at the measuring points, whereby a dialogue between the individual measured temperatures is established, so that the mutual influencing of these temperatures is taken into consideration.

It is a further object of the invention to provide a process which permits deficiencies to be detected, localized, and frequently eliminated without the need of dismantling the plant, as well as to automatically eliminate deficiencies when they occur due to incorrect temperatures.

It is a further object of the invention to provide an evaluating circuit which may be used in plants being operated with different types of molten material which require different temperature conditions.

These and other objects, advantages, features and benefits of the invention will become apparent from a reading of the following specification taken in conjunction with the drawings appended hereto.

DETAILED DESCRIPTION OF THE PREFERRED EMBODIMENT

Figure 1:
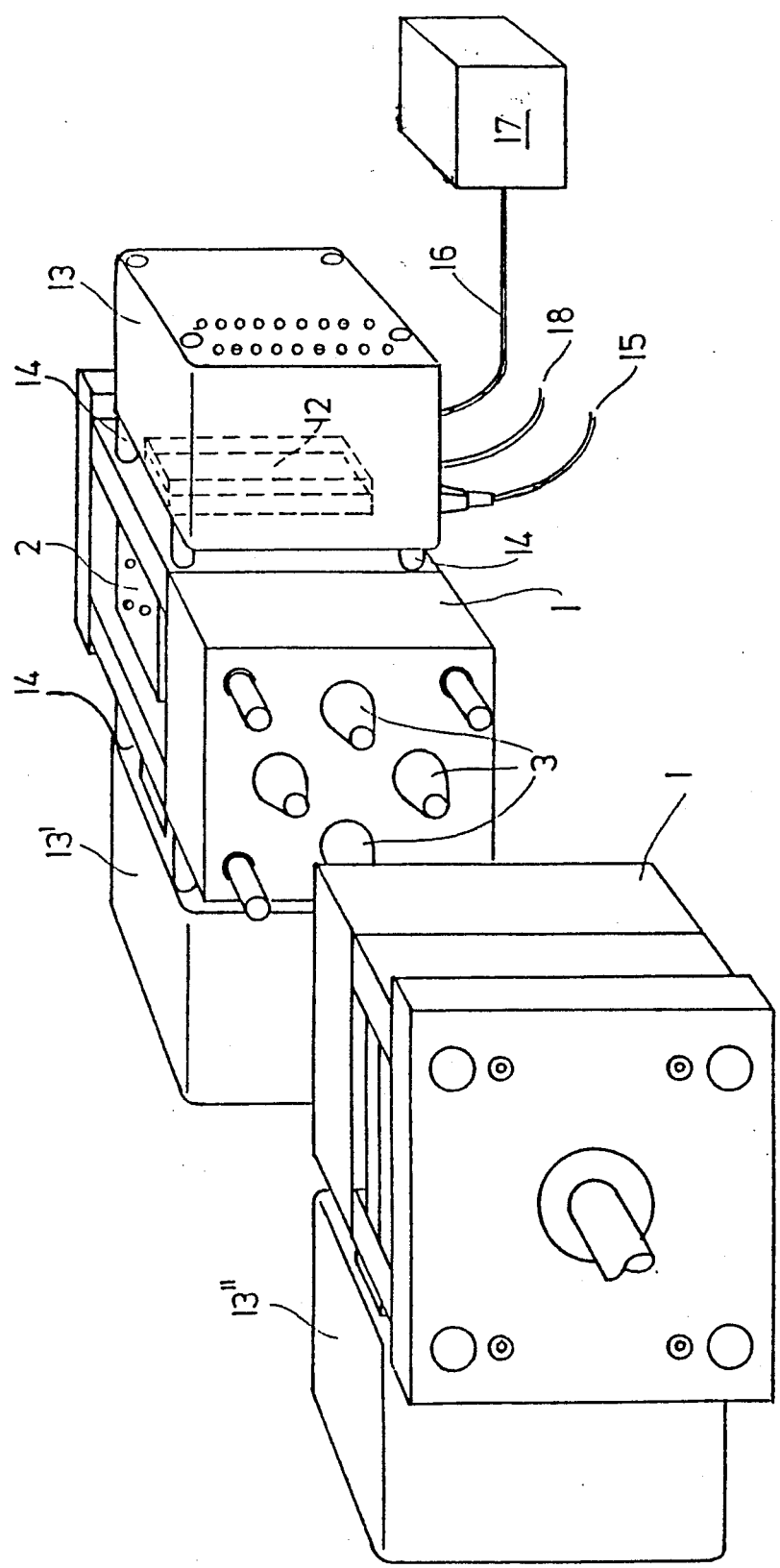
FIG. 1 is an exploded perspective view of a device according to the invention having a plurality of regulating means.

The inventive device for continuously producing injection molded parts includes an injection mold 1 of conventional design as shown in FIG. 1 in an exploded view. Within the injection mold 1 there is located a distributor channel 2 for the molten material, which is supplied from the channel into the mold cavity via punctual sprue nozzles 3.

Within the distributor channel 2 are arranged heating cartridges 4 as well as temperature sensors 5 for the heating temperature. Further heating of the melt is effected by means of a heating tape 6. Finally, the nozzles 3 are also heated and equipped with an internal temperature sensor.

Occasionally, cooling of the injection mold is also required. Such cooling is effected by means of a cooling agent, which is supplied via a cooling agent supply tube 7 and a solenoid valve 8 and leaves the mold at a mold exit 9. A temperature sensor 10 is provided for monitoring the temperature of the cooling agent.

Figure 2:
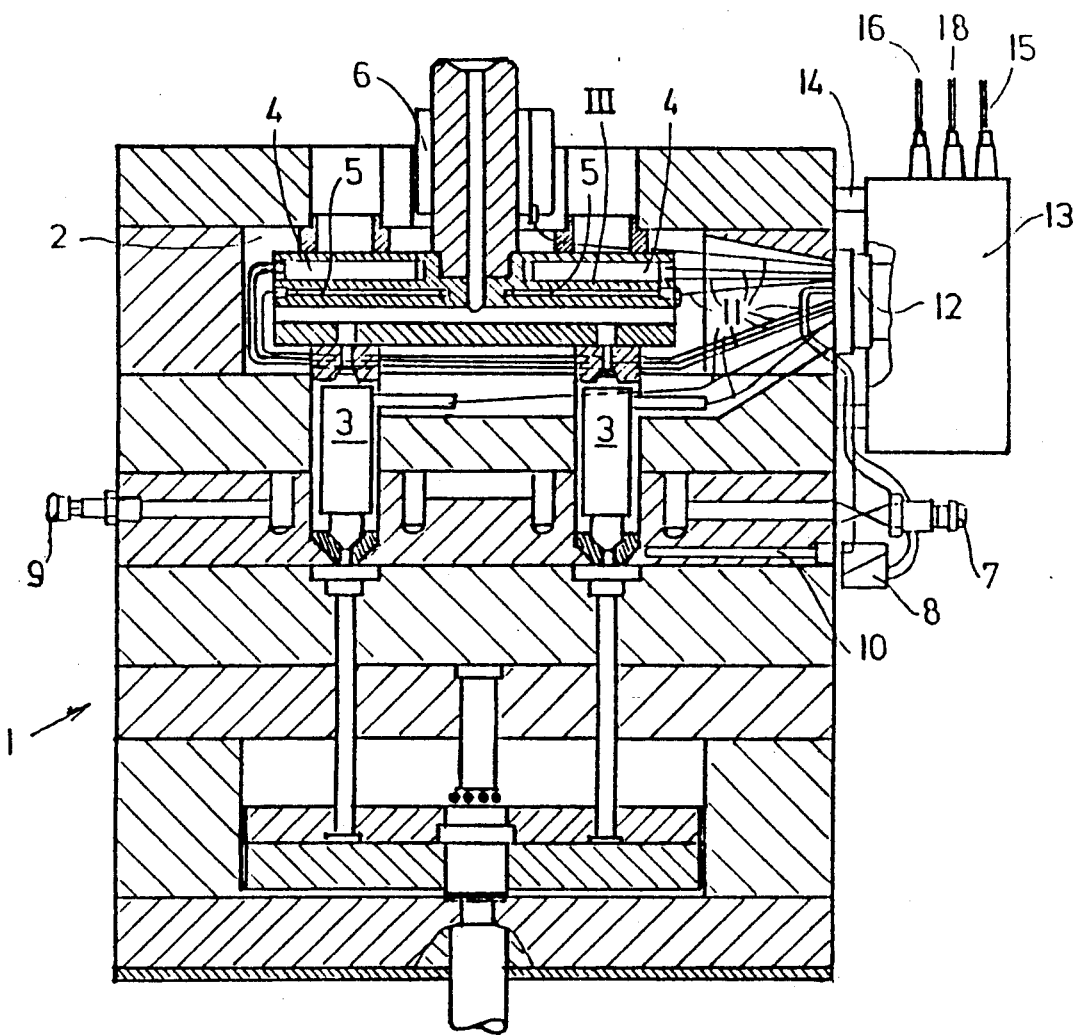
FIG. 2 is a partial cross-sectional view of the device according to the invention with one single regulating means.
Figure 3:
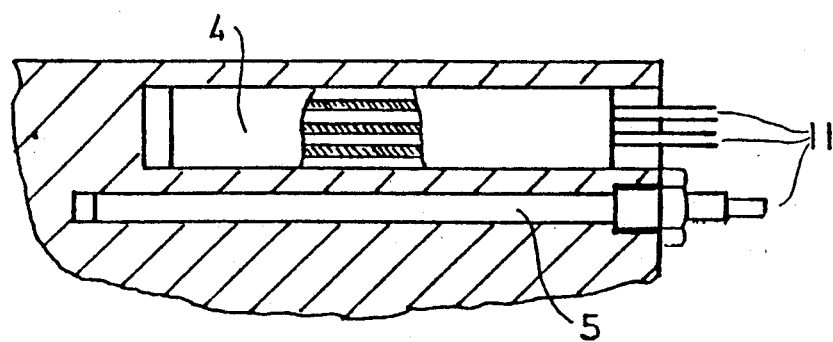
FIG. 3 illustrates in an enlarged scale the detail III of FIG. 2.

The heating cartridges 4, the heating tape 6, the heating means within the nozzles 3, the solenoid valve 8 for supplying cooling agent and the temperature sensors 5 and 10 as well as the temperature sensors located within the interior of the nozzles 3 are, by means of electrical conduits 11 installed within the interior of the injection mold 1, connected in an electrically conductive manner with an electric connector socket 12, via which at least one regulating means 13 is electrically connected. Only one such regulating means 13 is shown in FIG. 2. In the arrangement according to FIG. 1 there are, however, provided three such regulating means 13, 13', 13". In this case, each of the three regulating means 13, 13', 13" is, by means of an electrical connector socket 12 and via the electrical conduits 11, connected with certain heating means and/or cooling means and with certain temperature measuring means.

The regulating means 13 and, respectively, 13' and 13", are connected with the housing of the injection mold 1 in a mechanically releaseable manner by means of coupling elements 14. The coupling elements 14 provide, in combination with the electrical connector socket 12, for rapid attachment of the regulating means 13 on the housing of the injection mold 1.

For the purpose of obtaining an acceptable injection molded part it is necessary that the melt has, on the one hand, a definite viscosity and is, on the other hand, not heated to such high temperatures that it becomes decomposed. By means of the regulating means 13, which are connected with the sprue nozzles 3, the heating cartridges 4, and the heating tape 6 and with the control means for the cooling agent supply 8 as well as with the temperature sensors 5 and 10 via the electrical conduits 11, there are now measured or, respectively, determined all temperatures and correspondingly controlled the associated heating means and, respectively, cooling means, noting that the regulating means are additionally subjected to a mutual dialogue via corresponding electrical conduits, so that the heating means and cooling means are controlled in a coordinated manner. As already mentioned, it is in principle possible to vary the number of regulating means 13 used. In particular, it is possible, as is also illustrated by the example of the embodiment of FIG. 2, to utilize one single regulating means 13, in which case those electrical conduits provided within the interior of the injection mold 1 which interconnect the individual regulating means are omitted.

At least one regulating means 13 has a connector 15 for supplying the electrical energy required for the operation. Furthermore, at least one of the regulating means 13 is electrically connected via an external conduit 16 with a data supply and indicator means 17 (being only schematically represented) and is via a further external conduit 18 electrically connected with a control means (not shown), by means of which, for example, the flow of molten material to the distributor channel 2 is interrupted or by means of which the plant is completely shut down if an event occurs which might result in damage to the plant. The regulating means 13, 13' and 13" as well as the data supply and indicator means 17 are conveniently equipped to store a plurality of programs.

The separate provision of the data supply and indicator means 17 provides the possibility to separate from the regulating means the circuit elements required for supplying the data to the regulating means 13 and for the data display as soon as programming of the regulating means 13 has been effected and if, for example during full automatic operation, data display is not necessary.

The regulating means consist, for example, of a microprocessor having an analogous component and a digital component which can influence and monitor a plurality of analogous control means. The data supply and indicator means 17 is, via a standardized interconnection, in correspondence with the digital component. By means of this data supply and indicator means 17 which is not connected during normal operation, there is, on the one hand, effected programming of the regulating means or, respectively, of the plurality of regulating means for the purpose of obtaining optimum operating conditions and is, on the other hand, detected, in case of an error indication in one regulating means, on the means by plugging this means, and the operating conditions can optically be monitored. Such a trouble indication is delivered by a regulating means 13, for example as an optical signal, if a trouble occurs which cannot automatically be eliminated by the several regulating means and which might cause damage to the plant or of individual parts thereof. As a rule, the data supply and indicator means 17 allows a diagnosis of trouble without dismantling individual parts of the plant, occasionally even without the necessity to shut down the plant.

Preferably, the regulating means 13, 13', 13" are designed as standardized components having equally standardized connector pieces, so that they can be used in different equipment.

The device according to the invention permits regulation of the heating means and also the cooling means which, until now, required separate appliances.

I claim:

1. A device for producing injected molded parts comprising:
    a mold having at least one supply conduit for a molten material;
    heating means for heating said molten material in said at least one supply conduit;
    temperature measuring means for measuring the temperature of said molten material in said at least one supply conduit;
    at least one regulator removably attached to said mold; and
    an electrical connector having a first member attached to said mold and a second member attached to said at least one regulator, said second member of said electrical connector being electrically connected to said first member of said electrical connector when said at least one regulator is attached to said mold, said first member of said electrical connector being connected to said heating means and said temperature measuring means by electrical conduits disposed within said mold.

2. The device as claimed in claim 1, wherein said at least one regulator is electrically connected to a control means for regulating the flow of molten material to said at least one supply conduit.

3. The device of claim 1 further comprising means for cooling said molten material and wherein said means for cooling is electrically connected to said first member of said electrical connector.

4. The device as claimed in claim 1, wherein said at least one regulator is electrically connected to a data supply and indicator means.

5. The device as claimed in claim 2 wherein said at least one regulator comprises at least two regulating means removably attached to said mold, said mold having at least two of said first members attached thereto, each of said first members mating with a corresponding second member of an electrical connector attached to each of said at least two regulating means, each of said first members being electrically connected to selected heating means, temperature measuring means, cooling means and to each other by electrical conduits provided within the interior of said mold.

6. The device of claim 5 wherein said control means, data supply means and indicator means are connected to only one of said at least two regulating means.

7. The device as claimed in claim 4, wherein said data supply and indicator means have a store for several programs.

8. The device as claimed in claim 3, wherein said electrical conduits leading to all heating means, to all cooling means and to all temperature measuring means are in connection with one said at least one regulator via said electrical connector.

9. The device as claimed in claim 3, wherein said at least one regulator has a store for several programs.

* * * * *